United States Patent [19]
Vancas

[11] Patent Number: 5,558,780
[45] Date of Patent: Sep. 24, 1996

[54] STRIPPING/EXTRACTION SETTLER APPARATUS AND METHOD

[76] Inventor: Mark F. Vancas, 305 N. Main St., San Manuel, Ariz. 85631

[21] Appl. No.: 258,390

[22] Filed: Jun. 10, 1994

[51] Int. Cl.⁶ .............................. C02F 1/40; B01D 21/24
[52] U.S. Cl. ...................... 210/801; 210/519; 210/532.1; 210/540
[58] Field of Search .................. 210/519, 532.1, 210/538, 540, 801, 802, DIG. 5

[56] References Cited

U.S. PATENT DOCUMENTS

| | | | |
|---|---|---|---|
| 1,510,809 | 10/1924 | Sweetland | 127/48 |
| 1,672,583 | 6/1928 | Travers | 210/801 |
| 1,702,612 | 2/1929 | Morse | 210/519 |
| 2,118,157 | 5/1938 | Camp | 210/519 |
| 2,572,098 | 10/1951 | Baldwin | 210/532.1 |
| 3,341,016 | 9/1967 | Paasche | 210/801 |
| 3,419,145 | 12/1968 | De Celis | 210/519 |
| 3,804,252 | 4/1974 | Rishel | 210/532.1 |
| 4,157,969 | 6/1979 | Thies | 210/521 |
| 4,417,988 | 11/1983 | Cordoba-Molina | 210/802 |
| 4,422,931 | 12/1983 | Wolde-Michael | 210/519 |
| 4,722,800 | 2/1988 | Aymong | 210/519 |
| 4,957,628 | 9/1990 | Shultz | 210/519 |
| 5,122,280 | 6/1992 | Russell et al. | 210/532.1 |
| 5,266,191 | 11/1993 | Greene et al. | 210/195.1 |
| 5,326,474 | 7/1994 | Adams et al. | 210/519 |

FOREIGN PATENT DOCUMENTS 4-322705  11/1992  Japan.

*Primary Examiner*—Christopher Upton
*Attorney, Agent, or Firm*—Laura J. Zeman

[57] ABSTRACT

An apparatus and a method for separating heterogeneous mixtures of at least two components, including immiscible liquid/liquid solutions as in separating oil from water, or solid/liquid mixtures as in separating solid waste from sewage water. The apparatus allows for pre-separation before the influent enters the separator proper. The apparatus and a method provide for heterogeneous solutions to enter the apparatus at the same end at which the effluent is removed and in which an amount of separation occurs prior to the formal entrance to the separator tank. The tank geometry and structure are such that liquid/liquid solutions as well as solid/liquid solutions may be separated. The geometry and structure of the tank are also such that there is significant reduction in flow turbulence, laminar flow is utilized, and significant performance degradation in the purity of the resulting effluent are not seen as fluid flow continues.

24 Claims, 2 Drawing Sheets

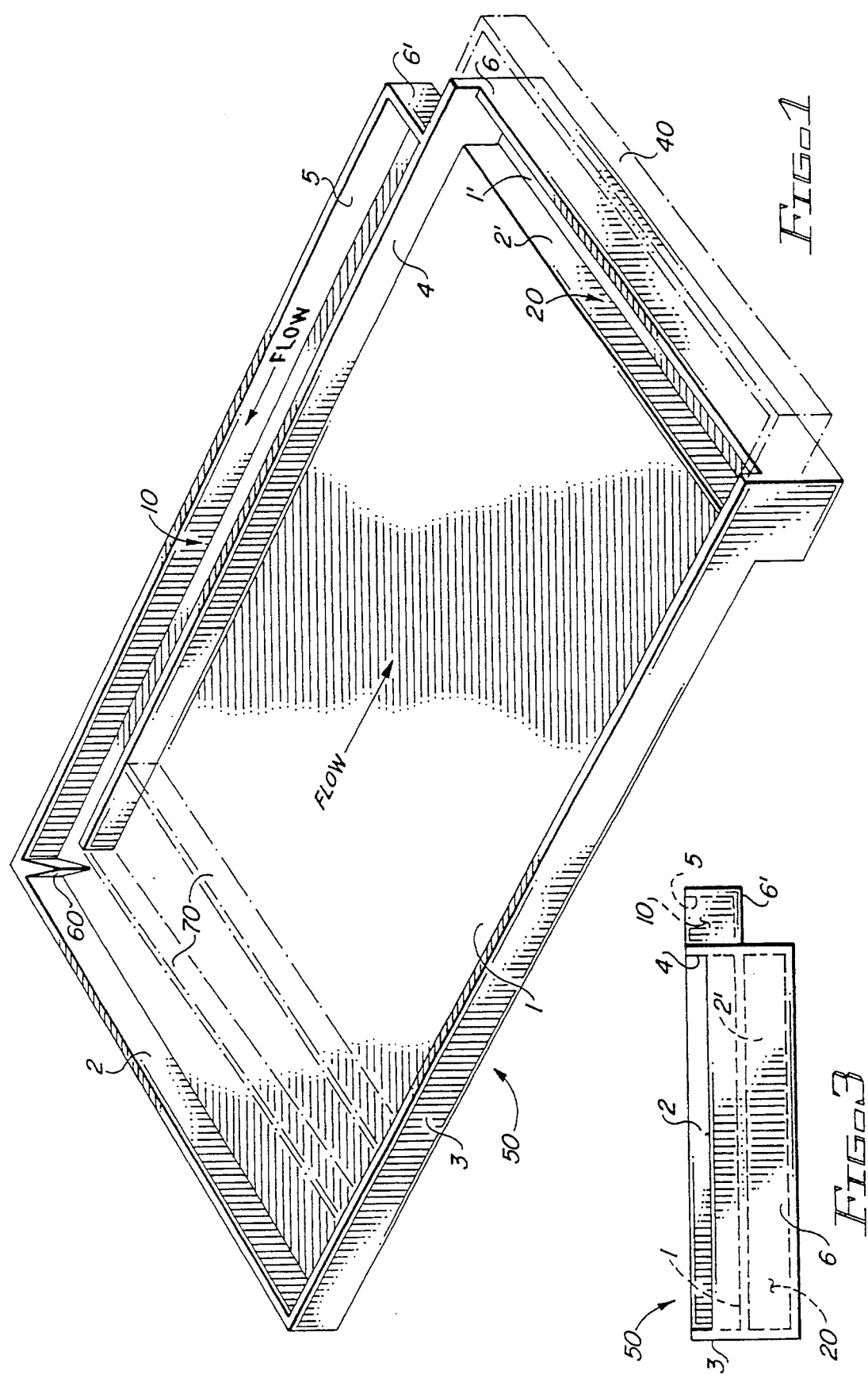

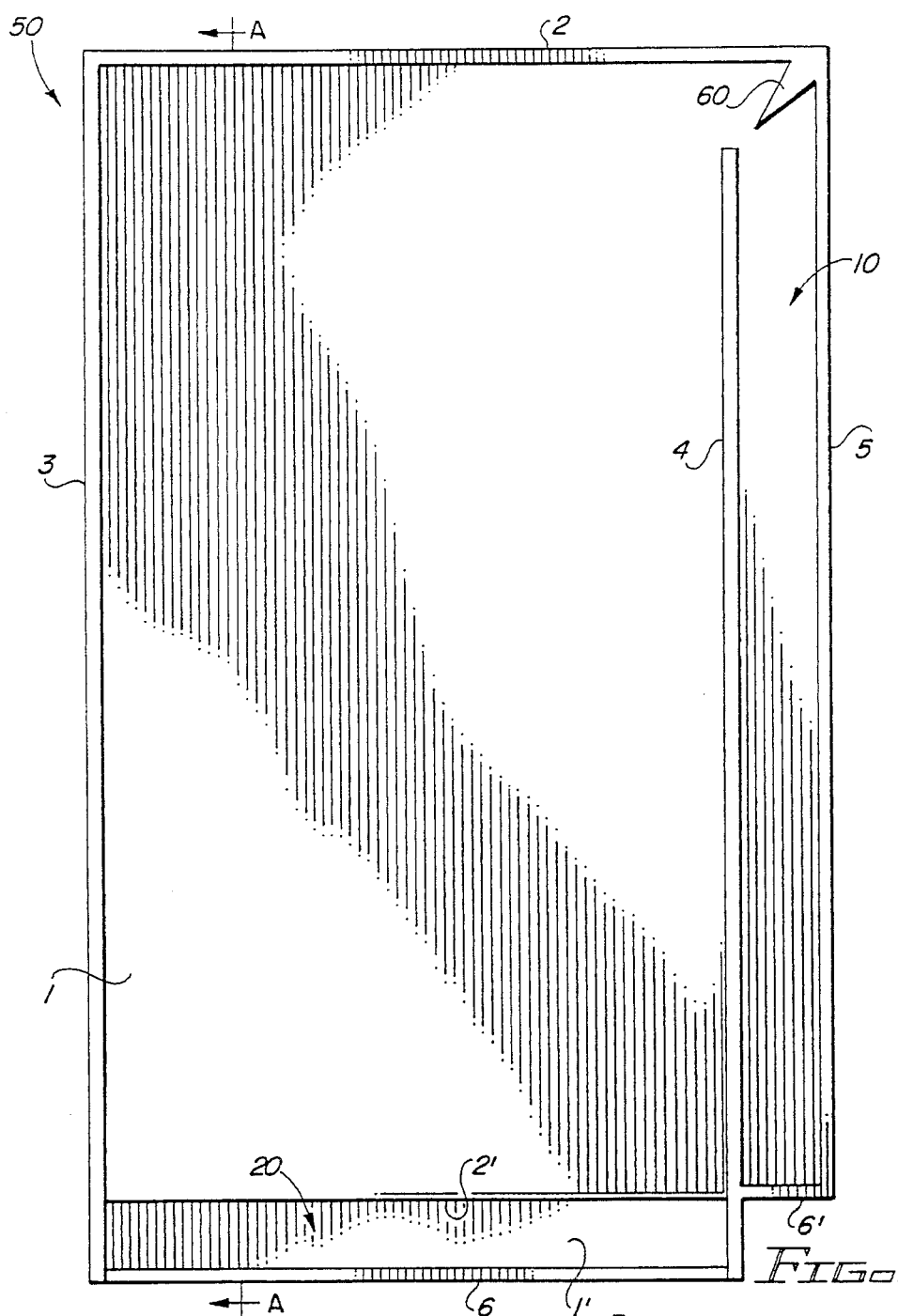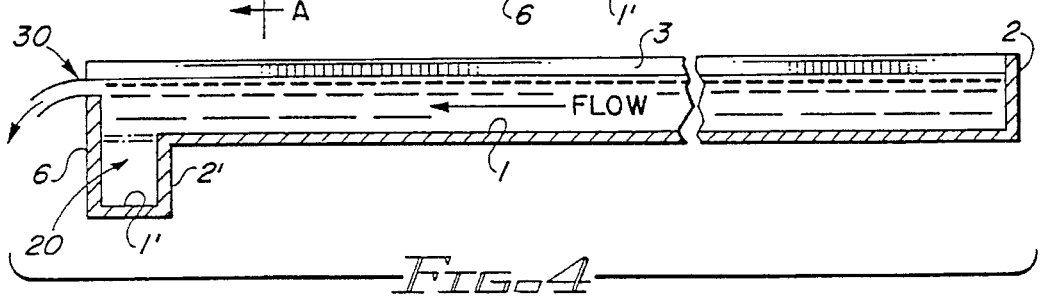

STRIPPING/EXTRACTION SETTLER APPARATUS AND METHOD

BACKGROUND OF THE INVENTION

The present invention relates generally, to an apparatus and a method for separating heterogeneous mixtures of at least two components. These mixtures could be immiscible liquid/liquid solutions as in separating oil from water, or solid/liquid mixtures as in separating solid waste from sewage water.

There are many different areas of industry that require the separation of heterogeneous mixtures. These mixtures are usually separated either for recycling or during waste disposal. In most cases there are requirements as to fluid purity, and recycling and construction costs. These requirements arise from many different sources, including increasing federal and state regulation of industrial and city waste water purity. This increased regulation creates a need for improved methods of separating solid wastes from waste water. Industries that utilize solvents or fluids as transport media find it increasingly economical to recycle the solvents and transport media. This is necessary to keep local aquifers and streams clean and pristine. As our culture becomes more and more environmentally conscious, the purity of fluid output increases. Even within nominally non-polluting industries there is a need for improved separation of particles and solvents from manufacturing techniques.

Prior solutions to this separation need have concentrated upon controlling any turbulence created upon injection of a waste fluid into one end (influent) of either a rectangular or a cylindrical separation tank and removed at an opposite end (effluent). The waste fluid flows from the influent end of the tank to the effluent end in either a laminar flow upon a separation field or in a slow moving bulk flow of the waste through baffles designed to aid in separation.

U.S. Pat. No. 1,672,583 issued to Travers on Jun. 5, 1928 is a device that consists of a tank with vertically offset baffles. These baffles are alternately offset from a bottom and top of the tank respectively. This allows the slow moving bulk solution of immiscible components with differing densities to separate and form a layer between the top and the bottom of the tank. The slow moving fluid travels first under then over alternate baffles. The top baffle acts as a skimmer preventing the less dense material from proceeding along the tank. As the slow moving nonturbulent or quiescent fluid travels under the next baffle it further separates at the surface contiguous with the next adjacent skimming baffle. The number of baffles and flow velocity of the fluid through the separator tank control purity.

U.S. Pat. No. 2,118,157 issued to Camp on May 24, 1938 discloses a method and apparatus for separation of particulate matter in a bulk flow separator tank. This invention allows the fluid to flow with sufficient velocity such that the denser particulate matter settles onto movable floor plates. These floor plates are mounted at a slight incline transverse to the separator tank on a movable means that aid in the transport of any resulting sludge to a disposal trough, or launder.

U.S. Pat. No. 3,419,145 issued to De Celis on Dec. 31, 1968 discloses vertical longitudinally mounted baffles in a large tank that direct the influent in an evenly distributed path along a flow direction. The fluid then flows along the separator tank into a set of exit transversely mounted offset baffles of a type similar to those disclosed by Travers. Finally the effluent is drawn off. The baffles at the influent end greatly reduce any turbulence due to influent influx, and the offset baffles at the effluent end are a final purification step before effluent removal. A combination of influent baffles, fluid flow velocity, and effluent baffles controls separation.

U.S. Pat. No. 4,257,969 issued to Thies on Jun. 12, 1979 addresses the separation of immiscible liquids in a cylindrical separator tank containing transversely mounted vertical baffles. The influent enters the tank at the top and is slowly forced through ports in the central portion of the baffles. The effluent is then drawn off at the bottom of the tank, and the separated fluid or emulsion is drawn off from various ports located at different positions at the top of the tank. The slow introduction of the influent coupled with the baffles effectively reduces turbulence and aides in separation of the different components.

U.S. Pat. No. 4,417,988 issued to Cordoba-Molina et al. on Nov. 29, 1983 addresses a final bulk flow solution. This invention creates an apparatus by mounting a flow constricting device at the effluent end of a bulk flow separator tank. This flow constricting device reduces internal waves or turbulence resulting from the flow of the waste fluid along the tank.

There have been turbulent solutions to separating particulates from a mixture in a bulk flow apparatus. U.S. Pat. No. 1,510,809 issued to Sweetland on Oct. 7, 1924 discloses a method and apparatus whereby addition of a flocculating agent and aeration removes the particulates found in mixtures such as unrefined sugar. Air bubbles trap the particulates and force them to the top where they are subsequently skimmed off. The effluent is then removed from the bottom of the tank.

Those practiced in the art recognize that laminar flow of heterogeneous solutions promote stable flow conditions and lead to a high degree of separation. U.S. Pat. No. 4,957,628 issued to Schulz on Sep. 18, 1990 teaches us a laminar flow solution to the separator tank problem. This invention is a tank whereby the influent enters a tapered trough mounted along a side of the separator tank. The influent then enters the separator tank through a variety of ports located in the side wall and is then directed in laminar flow between inclined transversely mounted plates. These plates are mounted on means such that the degree of inclination may be varied. A movable floor in a manner similar to the Camp patent of 1938 provides means for removal of any resultant sludge.

Finally, U.S. Pat. No. 5,266,191 issued to Greene et al. on Nov. 30, 1993 reveals a device in which the waste fluid flows along closely spaced longitudinally mounted plates. The close spacing of the plates promotes stable laminar flow and improved separation. Greene also provides for a serpentine path along which the waste fluid travels thus increasing separation time and improving purity of the resultant effluent.

All of these solutions require that the influent enter the separator at an end that is opposite the effluent removal end, with the exception of the Schulz patent in which the influent enters a trough that redirects the flow through ports mounted along a side wall. It would be useful to have a separator designed such that the influent enters on the same side that the effluent exits. This will aid in ease of maintenance and reduce construction costs. There is also a great amount of turbulence as the waste fluid enters the separator, meaning no appreciable separation of the components before they enter the separator tank proper. There is a great need for a device that provides for a certain amount of pre-separation before the influent enters the separator proper.

An object of this invention is to provide an apparatus and a method for which heterogeneous solutions may enter the apparatus at the same end at which the effluent is removed and in which an amount of separation occurs prior to the formal entrance to the separator tank. The tank geometry and structure are such that liquid/liquid solutions as well as solid/liquid solutions may be separated. The geometry and structure of the tank are also such that there is significant reduction in flow turbulence, laminar flow is utilized, and significant performance degradation in the purity of the resulting effluent are not seen as fluid flow continues.

A broad object of the present invention to provide a suitable method and apparatus for the separation of at least two component solutions with differing densities.

A further object of the present invention is to provide a method and apparatus for the separation of at least two component solutions with differing densities.

Another object of the present invention is to provide a method and apparatus for the separation of particulates from solution.

A still further object of the present invention is to provide a method and an apparatus with a coalescence chamber to enhance separation prior to entrance of the waste fluid into the separator proper.

A further object of the present invention is to provide a method and an apparatus that utilize baffles attached to corners of the coalescence chamber to aid in coalescence and reduction of turbulence in the influent.

SUMMARY OF THE INVENTION

The invention consists of a separator method and apparatus having a coalescence enhancement channel or launder located at a side of the separator apparatus. The purpose of the coalescence enhancement channel is to provide for pre-separation of waste fluid prior to entrance into a separator basin proper, and is an aid to the transfer of solution from a first end to an end opposite the end that the effluent is removed. Coalescing baffles may be included in corners of the launder to enhance coalescence and reduce turbulence that takes place in the launder prior to the waste fluid entering the separator apparatus. The separator apparatus also may include at least two flow distributions fences that are mounted transverse to a laminar flow direction in either parallel or canted orientations. These flow fences aid in even fluid distribution and reduction of turbulence along the separator basin.

It is an object of this invention to provide a simply configured and constructed apparatus.

Another object of this invention is to provide a method and an apparatus capable of separating out solids from liquids.

A further object of this invention is to provide a method and an apparatus capable of separating out at least two immiscible liquids of differing densities.

A still further object of this invention is to provide a method and an apparatus that maintains influent and effluent means located at the same ends for use in industrial configurations.

Another object of this invention is to provide a method and an apparatus that consists of a launder of coalescing baffles mounted at corner sites to greatly enhance the coalescence that takes place in the launder as well as help the mixture make a smooth transition around the corner before entering the separator proper.

An additional object of this invention is to provide a launder mounted at a side of the separator proper.

Further objects and advantages of this invention will appear more clearly from the following description of a non-limiting illustrative embodiment and the accompanying drawings in which the like numerals designate like parts throughout the several views.

BRIEF DESCRIPTION OF THE DRAWINGS

Briefly summarized, a preferred embodiment of the invention is described in conjunction with the illustrative disclosure thereof in the accompanying drawings, in which:

FIG. 1 is an isometric view of the present invention with a pair of flow distribution fences that are not an integral part of the separator.

FIG. 2 is a plan view of the present invention.

FIG. 3 is a front view of the present invention.

FIG. 4 is a cross sectional view of the present invention taken substantially along a line A—A shown in FIG. 2.

DETAILED DESCRIPTION OF THE PREFERRED EMBODIMENTS

FIRST EXAMPLE

Referring to FIGS. 1–4, construction of a separator apparatus is via a laminar flow separator basin 50 consisting of a first bottom 1 of dimension 9 meters by 14.05 meters, a first side 3 connected to the first bottom 1 along one of the long sides, and a first back side 2 connected to the first bottom 1 and the first side 3, a second side 4 connected to the first bottom 1 at along a line set 1 meter in from a side opposite the first long side and extending to within 1 meter of the first back side 2.

The separator basin 50 further consists of a coalescence enhancement chamber 10 that consists of a channel formed by the second side 4 and a third side 5 connected to the first bottom 1 and the first back side 2. This coalescence enhancement chamber 10 is terminated by a means for influent ingress 6' set one meter back from a front side 6 of the separator basin 50.

A portion of the separator basin 50 immediately adjacent to the front side 6 is recessed to form an underflow launder 20 consisting of a second bottom 1' recessed one meter under the first bottom and connected to the first side 3 and the second side 4, a second back side 2' attached between the first bottom and the second bottom 1' and further attached to the first side 3 and the second side 4, and the front side 6 connected to the second bottom 2', the first side 3, and the second side 4

The front side 6 is constructed such that it does not extend the full height of the first and second side walls 3 and 4, but terminates 0.5 meters from the top. This gap 30 provides an effluent egress means that leads to an optional overflow launder 40. This overflow launder 40 could consist of a second trough intermediate between the separator basin 50 and further processing means.

SECOND EXAMPLE

The separator apparatus, as in the first example, further equipped with at least one baffle mounted in a corner 60 of the coalescence enhancement chamber 10. The vertex of the back side 2 and the third side 5 defines this corner. This at least one baffle provides a means for further enhancing coalescence by reducing turbulence resulting from the change in flow direction as the fluid flows down the coalescence enhancement chamber 10 into the separator proper. This combination provides for considerable coalescence prior to fluid entrance into the separator basin 50 proper.

THIRD EXAMPLE

The separator apparatus, as in the first example, further equipped with at least two flow distribution fences 70. These flow distribution fences 70 are mounted in the separator basin 50 transversely at an end nearest the back side 2. These at least two flow distribution fences are mounted either parallel to each other, or can be mounted canted with respect to each other. The purpose of these flow distribution fences 70 is to reduce turbulence of the flowing fluid as it enters the separator basin 50 proper.

FOURTH EXAMPLE

The separator apparatus, as in the first example, further equipped with an overflow launder 80. This overflow launder is attached to the front side 6 at the gap 30 that provides effluent egress means. The purpose of this overflow launder 80 is to collect the effluent and direct it toward further processing.

FIFTH EXAMPLE

The separator apparatus, as in the first example, equipped with at least one corner baffle, at least two flow distribution fences, and an overflow launder.

Where the preferred embodiments have been described above, it will also be apparent to those of ordinary skill in the art that various modifications may be made to the above teachings and from practice of the invention. Such changes include varying the pitch of the bottom 1, canting angle of the flow distribution fences 70, overall size of the separator apparatus and optional launders, and combination of the options above mentioned. The present invention is not deemed to be defined in any way by the foregoing description and is defined by the following claims.

What is claimed:

1. An apparatus for separating a heterogeneous mixture which comprises:
   (a) a separator tank;
   (b) means for withdrawal of an effluent flow connected to one side of the separator tank;
   (c) means for an influent flow located near the side of the separator tank where the effluent is withdrawn; and
   (d) means for transporting an influent to a wall of the separator tank furthest from the means for withdrawal of the effluent wherein said means for transporting an influent is connected to the means for an influent flow and lies adjacent a length of the separator tank such that a bottom of said means for transporting an influent is in longitudinal planar alignment with a bottom of said separator tank along substantially an entire length of the separator tank.

2. An apparatus as in claim 1 wherein said means for transporting an influent comprises a structure having at least one corner section and a baffle mounted within said corner section such that it protrudes at an angle from said corner section.

3. An apparatus as in claim 1 with at least two flow distribution fences mounted transverse to the mixture flow direction.

4. An apparatus as in claim 3 wherein said means for transporting an influent comprises a structure having at least one corner section and a baffle mounted within said corner section such that it protrudes at an angle from said corner section.

5. An apparatus as in claim 1 in which said separator tank contains an overflow launder transverse to the direction of flow of the mixture at an end nearest the effluent means.

6. An apparatus as in claim 5 with at least two flow distribution fences transverse to the mixture flow direction.

7. An apparatus as in claim 6 wherein said means for transporting an influent comprises a structure having at least one corner section and a baffle mounted within said corner section such that it protrudes at an angle from said corner section.

8. An apparatus as in claim 5 wherein said means for transporting an influent comprises a structure having at least one corner section and a baffle mounted within said corner section such that it protrudes at an angle from said corner section.

9. A method for separating a heterogeneous mixture which comprises:
   (a) flowing an influent mixture;
   (b) transporting the influent mixture from a point near a means for withdrawal of an effluent to a wall furthest from the means for withdrawal of the effluent via a transport channel lying adjacent to a separator tank wherein the transport channel is in planar longitudinal alignment with a bottom of the separator tank along substantially an entire length of the separator tank;
   (c) separating the influent in the separator tank; and
   (d) flowing an effluent mixture.

10. A method as recited in claim 9 further limited by flowing the mixture through at least one coalescing baffle mounted in a corner during the transporting of the influent mixture.

11. A method as recited in claim 9 further limited by flowing the mixture through at least two flow distribution fences mounted transverse to the mixture flow direction.

12. A method as recited in claim 9 further limited by flowing the mixture through at least one coalescing baffle mounted in a corner during the transportation of the influent mixture.

13. A method recited in claim 9 further limited by flowing the mixture through an overflow launder transverse to the direction of flow of the mixture near the means for withdrawal of the effluent.

14. A method as recited in claim 13 further limited by flowing the mixture through at least two flow distribution fences mounted transverse to the mixture flow direction.

15. A method as recited in claim 14 further limited by flowing the mixture through at least one coalescing baffle mounted in a corner during the transporting of the influent mixture.

16. A method as recited in claim 15 further limited by said mixture consisting of at least two immiscible liquids.

17. A method as recited in claim 15 further limited by said mixture consisting of particulates and at least one liquid.

18. A method as recited in claim 13 further limited by flowing the mixture through at least one coalescing baffle mounted in a corner during the transporting of the influent mixture.

19. A method as recited in claim 9 further limited by said mixture consisting of at least two immiscible liquids.

20. A method recited in claim 9 further limited by said mixture consisting of particulates and at least one liquid.

21. An apparatus for separating a heterogeneous mixture comprising:

(a) a separator tank having opposite first and second ends;

(b) means for an influent flow and means for withdrawal of an effluent both located at the first end of said separator tank; and (c) a coalescence enhancement channel located along a side of the separator tank connecting the means for an influent flow to the second end of the separator tank thereby enabling the influent flow to be transferred along a length of the separator tank from the first end of the separator tank to the second end of the separator tank wherein the coalescence enhancement channel is in planar longitudinal alignment with a bottom of the separator tank along substantially an entire length of the separator tank.

22. The apparatus of claim 21 further comprising at least one coalescing baffle mounted within a corner of said coalescence enhancement channel such that it protrudes at an angle from said corner section.

23. The apparatus of claim 21 further comprising an overflow launder located at the first end of the separator tank near the means for withdrawal of an effluent and transverse to a direction of mixture flow.

24. The apparatus of claim 21 further comprising at least two distribution fences mounted transverse to a direction of mixture flow.

\* \* \* \* \*